(12) United States Patent
Bilobrov

(10) Patent No.: US 9,110,928 B2
(45) Date of Patent: Aug. 18, 2015

(54) MEDIA IDENTIFICATION SYSTEM FOR EFFICIENT MATCHING OF MEDIA ITEMS HAVING COMMON CONTENT

(71) Applicant: Yahoo! Inc., Sunnyvale, CA (US)

(72) Inventor: Sergiy Bilobrov, Santa Clara, CA (US)

(73) Assignee: YAHOO! INC., Sunnyvale, CA (US)

( * ) Notice: Subject to any disclaimer, the term of this patent is extended or adjusted under 35 U.S.C. 154(b) by 96 days.

(21) Appl. No.: 14/071,153

(22) Filed: Nov. 4, 2013

(65) Prior Publication Data

US 2014/0067863 A1  Mar. 6, 2014

Related U.S. Application Data

(63) Continuation of application No. 12/621,472, filed on Nov. 18, 2009, now Pat. No. 8,594,392.

(51) Int. Cl.
```
G06K 9/46        (2006.01)
G06K 9/54        (2006.01)
G06F 7/00        (2006.01)
G06F 17/30       (2006.01)
G06K 9/00        (2006.01)
G06K 9/32        (2006.01)
```

(52) U.S. Cl.
CPC ...... *G06F 17/30268* (2013.01); *G06K 9/00711* (2013.01); *G06K 9/3233* (2013.01)

(58) Field of Classification Search
CPC ............ G06F 17/30023; G06F 17/30268; G06K 9/00744; G06K 9/4671; G06K 9/00711; G06K 9/3233; G06K 9/64; Y10S 707/913

USPC ......... 382/124, 100, 115, 125, 168, 173, 174, 382/181, 190, 195, 199, 276, 305; 707/705, 707/736, 741, 747, 758, 769, E17.001, 707/E17.014, E17.1, E17.101, E17.009, 707/790, 802, 803, E17.052, E17.044, 707/E17.045, E17.049
See application file for complete search history.

(56) References Cited

U.S. PATENT DOCUMENTS

| | | | | |
|---|---|---|---|---|
| 6,236,741 B1 * | 5/2001 | Kovacs-Vajna | ............... | 382/125 |
| 6,977,723 B2 * | 12/2005 | Lemmo et al. | ................ | 356/301 |
| 8,565,534 B2 * | 10/2013 | Takahashi | ..................... | 382/209 |

\* cited by examiner

*Primary Examiner* — Sheela Chawan
(74) *Attorney, Agent, or Firm* — James J. DeCarlo; Greenberg Traurig, LLP

(57) ABSTRACT

To identify a media item from a database of media items that have common content, a region of interest is defined to include a plurality of frames of a test fingerprint that correspond to different segments of a media item. A media identification system queries a database of reference fingerprints to identify candidate reference fingerprints that contain a frame that matches a frame of the test fingerprint. When a candidate reference fingerprint is found, additional matching frames are determined and the region of interest is reduced to eliminate the matched frames of the test fingerprint. This continues until the region of interest is empty or there are no further matching candidates. Once the set of candidate reference fingerprints are identified, the media identification system compares the test fingerprint to the candidates to determine a closest match, thereby identifying the media item associated with the test fingerprint.

20 Claims, 6 Drawing Sheets

MEDIA IDENTIFICATION SYSTEM FOR EFFICIENT MATCHING OF MEDIA ITEMS HAVING COMMON CONTENT

This application is a continuation of and claims the benefit of U.S. Pat. No. 8,594,392 filed Nov. 18, 2009, which is hereby incorporated by reference in its entirety.

BACKGROUND

This invention relates generally to media identification systems, and in particular to the identification of unknown media items from a database of known media items that may have portions of common content.

Digital fingerprinting is a process that can be used to identify unknown digital media samples, such as audio or video samples. In an example media identification system, digital fingerprints are generated for each of a number of known media samples, which may be obtained from data files, broadcast programs, streaming media, or any of a variety of other media sources. Each digital fingerprint may comprise a data segment that contains characteristic information about a sample of the media from which it was generated. U.S. Pat. No. 7,516,074, which is incorporated by reference in its entirety, describes embodiments for generating characteristic digital fingerprints from a data signal.

The reference fingerprints are then stored in a database, or repository, and indexed in a way that associates the reference fingerprints with their corresponding media samples and/or metadata related to the media samples. U.S. Pat. No. 7,516,074 also discloses embodiments for indexing reference fingerprints in a database. The database of reference fingerprints can be used to identify an unknown media sample. To identify an unknown media item, a test fingerprint is generated from a sample of the media item. The test fingerprint is then matched against the database of reference fingerprints and, if a match is found, the unknown media sample is declared to be media sample associated with the matching reference fingerprint. Various exact matching and fuzzy matching algorithms and criteria for declaring a valid match may be used.

Due to the large number of reference fingerprints in a practical application, the reference fingerprints may be stored in a large-scale distributed database. Because the distributed database may include a large number of items (e.g., reference fingerprints) stored on multiple servers, the database may contain duplicates and different versions of the same or similar reference fingerprints. While exact duplicates can be detected and removed from the database, the database may still include a lot of partial duplicates that share some common parts but represent different media objects. For example, different episodes of the same TV or radio program usually have a few common portions, such as the introduction, the opening music, and the credits. Another example is a set of movies produced by the same movie company, which although they may be completely unrelated, they usually have the identical company logo and music displayed in their beginning frames. Some broadcast streams may also contain significant number of repeating fragments (e.g., commercials, promos, or jingles) even though they represent different broadcast streams.

Multimedia search engines often employ techniques to reduce the database size and speed up the search process. For example, a multimedia search engine may use an indexing scheme to identify quickly a set of candidate reference fingerprints, which are then compared against a test fingerprint to verify a match. The fingerprint index is usually stored in computer memory (e.g., RAM), which makes the candidate selection process fast and efficient. On the contrary, the candidate verification process involves loading additional information (usually, a complete fingerprint) from a storage memory (e.g., hard disk drive) into RAM. This storage memory input/output is significantly slower than RAM access, and a large number of slow storage memory input/output operations required to verify candidates can significantly degrade the system performance.

While the number of false candidates can be reduced by improving the fingerprint indexing technology and tuning the search discriminating properties, this does not change the number of reference media items that have common content, which number may be significant. Previous techniques use methods of candidate verification that are based on comparison of multiple fingerprint blocks around the initial candidate matching point. Although these methods may enable finding a proper target media object (i.e., the longest match) among all candidates, they require verification and evaluation of all found candidates, including all partial candidates. For example, if a database contains 1000 episodes of the same media program, and all of these episodes contain the same introduction (or logo or overture), all 1000 candidate episodes must be verified to find the best match.

It would be desired to provide a search method that can more efficiently identify unknown media items using a database of known media items that may have portions of common content.

SUMMARY

To identify a media item from a database of media items that have common content, embodiments of the invention use a test fingerprint that is generated for the unknown media item, where the fingerprint includes a plurality of sub-fingerprints or frames that correspond to different segments of the media item. For example, a fingerprint of an audio signal may include a number of frames that contain characteristic data about consecutive time segments of that audio signal. A region of interest is initially defined to include all of the frames of the test fingerprint. A media identification system queries a database of reference fingerprints to identify one or more candidate reference fingerprints, where a candidate reference fingerprint contains a frame that matches (exact or fuzzy) a frame of the test fingerprint. When a candidate reference fingerprint is found, additional matching frames may be determined, and the region of interest is reduced such that the matched frames of the test fingerprint are eliminated from the region of interest. The process may continue until the region of interest contains no more frames or until there are no more reference fingerprints that have frames that match a frame of the test fingerprint. Once the set of candidate reference fingerprints are identified, the media identification system can compare the test fingerprint to the candidates to determine a closest match, thereby identifying the media item associated with the test fingerprint.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

In digital fingerprinting applications, digital fingerprints sampled from unknown audio or video content are compared with a reference database of digital fingerprints taken from known audio or video programming so as to identify the unknown content. Identifying the unknown content is desirable because, for example, it may permit the metadata of the unknown content to be repaired or allow for the control of the distribution of copyrighted material, among many other applications of media identification systems.

Figure 1:
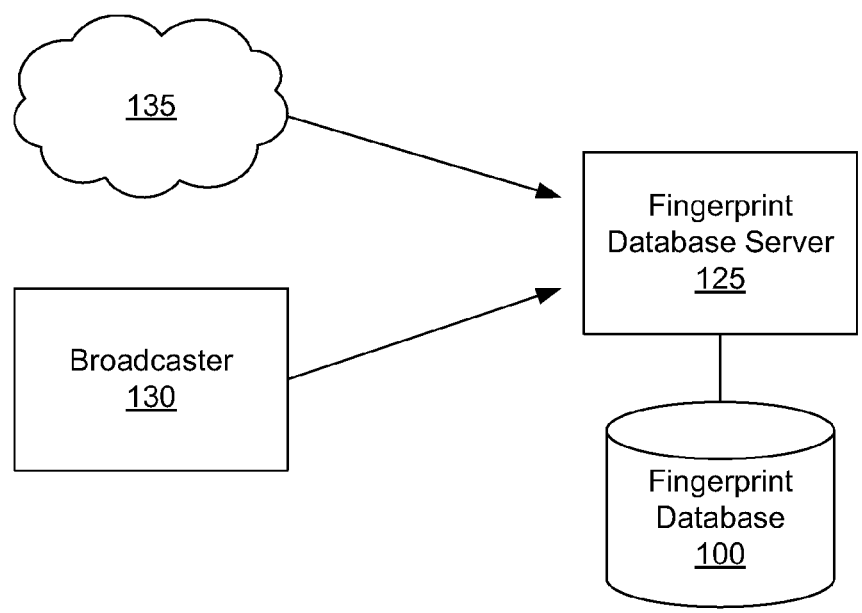
FIG. 1 is a schematic diagram of a media identification system, in accordance with an embodiment of the invention.

FIG. 1 shows an arrangement for implementing a media identification system. A database 100 of reference fingerprints and a fingerprint database server 125 are shown. The fingerprint database server 125 is programmed to receive fingerprints from an external source and/or to execute a fingerprint generation algorithm that creates reference fingerprints from a received media sample. In one embodiment, the database server generates reference fingerprints from broadcast programs transmitted by a broadcaster 130. In another embodiment, the fingerprint database server 125 samples media content from a computer network 135, such as file sharing networks or an Internet website, and creates reference fingerprints from that sampled media content. In another embodiment the content identification system obtains the reference content from the content owner 140. The fingerprint database server 125 stores the generated reference fingerprints in the database 100 so they can be used to identify unknown media samples, as described herein.

Figure 2:
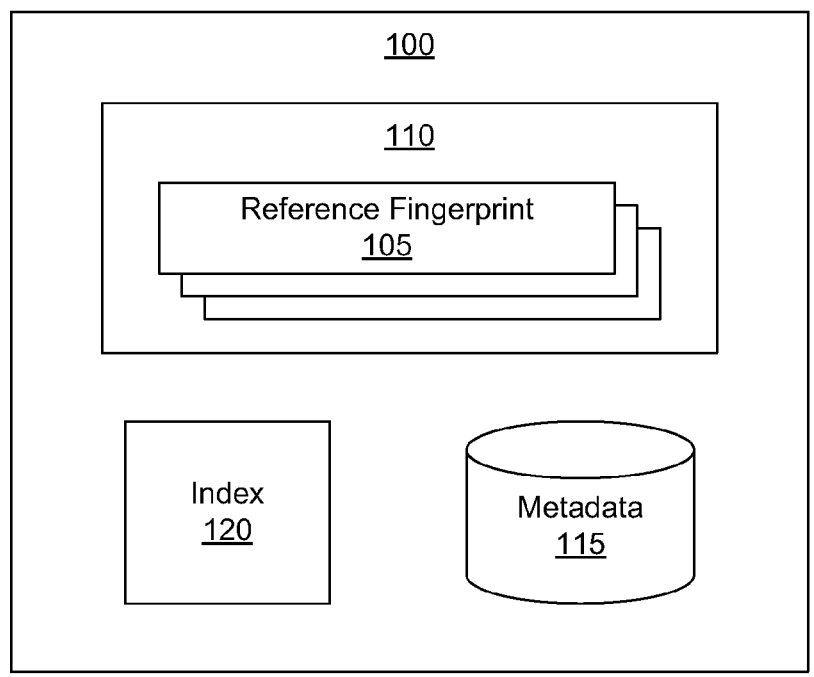
FIG. 2 is a schematic diagram of a database of reference fingerprints, in accordance with an embodiment of the invention.

FIG. 2 illustrates an embodiment of the reference fingerprint database 100 in more detail. In this embodiment, the database 100 includes a plurality of standard-sized reference fingerprints 105 stored in a data structure 110. The reference fingerprints 105 may comprise digital fingerprints for a portion of media content, such as an audio or video signal. Also included in the database 100 is metadata 115 associated with each reference fingerprint 105. The metadata 115 may include information about the digital media content attributed to the reference fingerprints 105, such as the title, artist, genre, producer, copyright date, broadcast channel, and broadcast date, among other information that is descriptive of the media content and/or how the media content was obtained. The metadata 115 may be extracted from the broadcast programs or otherwise obtained by the fingerprint database server 125 from a system that maintains metadata about the known media content (such as an electronic program guide). The metadata 115 may have many-to-many relationship with the fingerprints 105. A metadata structure can refer to multiple fingerprints and a fingerprint or its segments can relate to several metadata records. A fingerprint can also relate to other fingerprints: a region of a fingerprint can be exact or modified version of a region of another fingerprint. In addition, multiple fingerprints may represent different temporal or spatial segments of the media content. The database 100 also includes an index 120 that can be used to identify a candidate set of fingerprints that may match a test fingerprint, for example as described in U.S. Pat. No. 7,516,074. Once a candidate fingerprint is identified, all related fingerprints and metadata may be easily identified as well.

Figure 3:
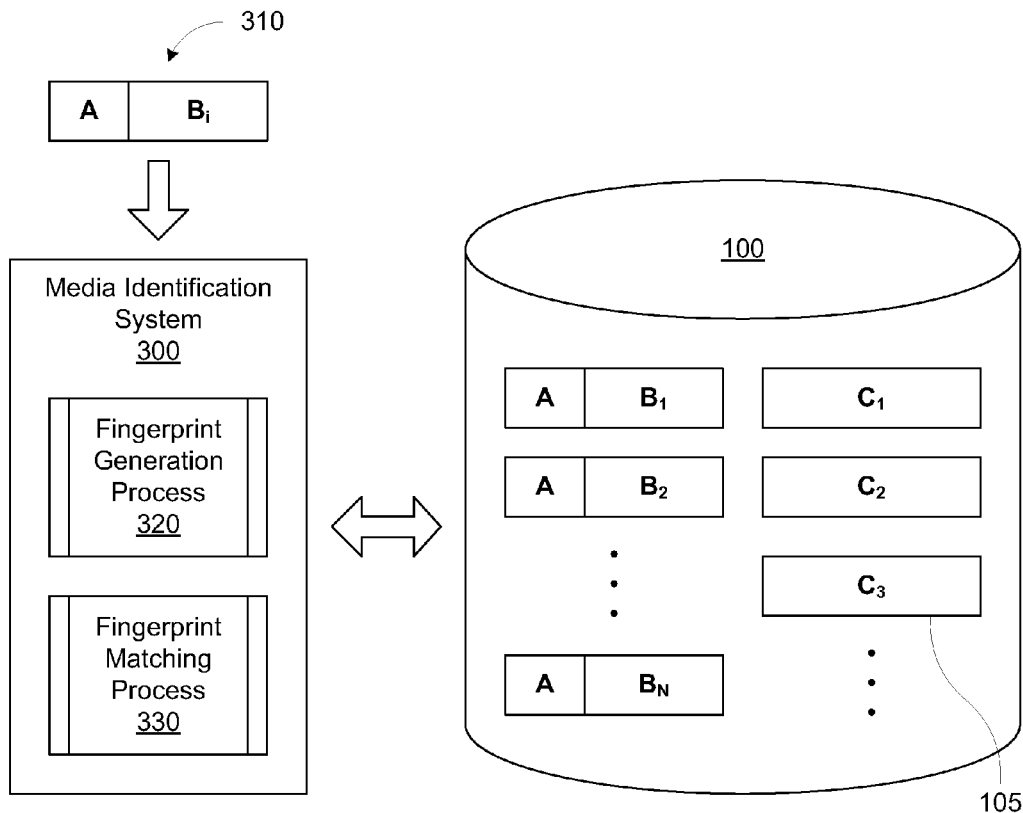
FIG. 3 is a diagram of a process for matching an unknown media item using a media identification system, in accordance with an embodiment of the invention.

FIG. 3 illustrates a media identification system 300 that is programmed to identify an unknown media item 310 using a reference fingerprint database 100. The unknown media item 310 may include digital audio or video data sampled from a broadcast program, streaming media received from a website, or any other source of media content. In the case of media that is streamed over the Internet, the media item 310 may be sampled by a software program, such a "robot" or "spider," which crawls the Internet to look for shared audio or video content to sample. The unknown media item 310 may also be obtained from data or files that are shared across a file sharing network.

In one embodiment, the media identification system 300 runs a fingerprint generation process 320 that generates one or more test fingerprints for the unknown media item 310. Embodiments of fingerprint generation processes are described in U.S. Pat. No. 7,516,074, although other suitable algorithms may be used. The media identification system 300 also runs a fingerprint matching process 330 that matches the one or more test fingerprints to reference fingerprints 105 stored in the reference fingerprint database 100. Embodiments of fingerprint indexing and matching processes are described in U.S. Pat. No. 7,516,074, although other suitable algorithms may be used. Upon finding a match, the media identification system 300 can identify the unknown media item 310 using the metadata 115 that corresponds to one or more of the reference fingerprints 105 that matched with the test fingerprint.

In the example scenario depicted in FIG. 3, the unknown media item 310 includes a portion that is in common with some of the known media items from which some of the reference fingerprints 105 were generated. This common content is indicated by the portions of the reference fingerprints 105 in the fingerprint database 100 that are also designated with the reference A. The unknown media item 310 also includes a portion $B_i$ that is not common to or found in all of the media items from which the reference fingerprints 105 were generated. As explained above, the reference fingerprint database 110 may include reference fingerprints 105 generated from media programs, movies, and other media content where distinct media items have portions in common (e.g., commercials in a radio broadcast, or the introduction frames in a movie made by the same studio). In addition, the reference fingerprint database 110 may also contain reference fingerprints 105 that were generated from media that does not have any portions in common with the unknown media item 310 (where these fingerprints are designated by the reference $C_i$), or any combination of A, B and C.

Figure 4:
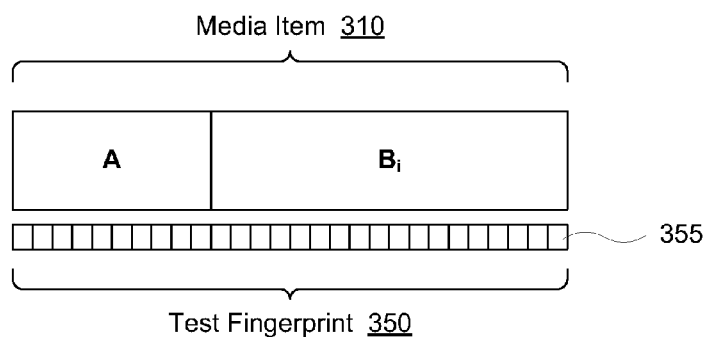
FIG. 4 is a diagram of an unknown media item and its associated fingerprint, which has multiple frames corresponding to segments of the media item, in accordance with an embodiment of the invention.

FIG. 4 illustrates an embodiment of a test fingerprint 350 that is generated from the unknown media item 310 using the fingerprint generation process 320. The test fingerprint 350 comprises a plurality of frames 355, where each frame 355 is itself a digital fingerprint for a time segment of the media item 310. Accordingly, the individual frames 355 of the fingerprint 350 are characteristic of their corresponding time segments of the media item 310, as indicated in the figure. In one embodiment, each frame 355 of the fingerprint 350 is generated from a three-second portion of the media item 310, although other time segments can be chosen.

Referring again to FIG. 3, it can be appreciated that the test fingerprint 350 generated from the unknown media item 310 will at least partially match with multiple reference fingerprints 105 in the reference fingerprint database 110. In particular, the fingerprint matching process 330 may identify as candidate reference fingerprints any of the reference fingerprints 105 that were derived from media items that have common portions A, since at least some of the frames of those fingerprints 105 would be the same as or similar to frames 355 of the test fingerprint 350. The fingerprint matching process 330 may then compare the identified candidate reference fingerprints to determine which of those candidates most closely matches the test fingerprint 350. This latter comparison test may involve a more rigorous bitwise comparison of the fingerprints using disk accesses, rather than a simple index search that may be performed in memory. Therefore, it would be desirable to reduce the number of candidate reference fingerprints that the fingerprint matching process 330 must compare to the test fingerprint.

Figure 5:
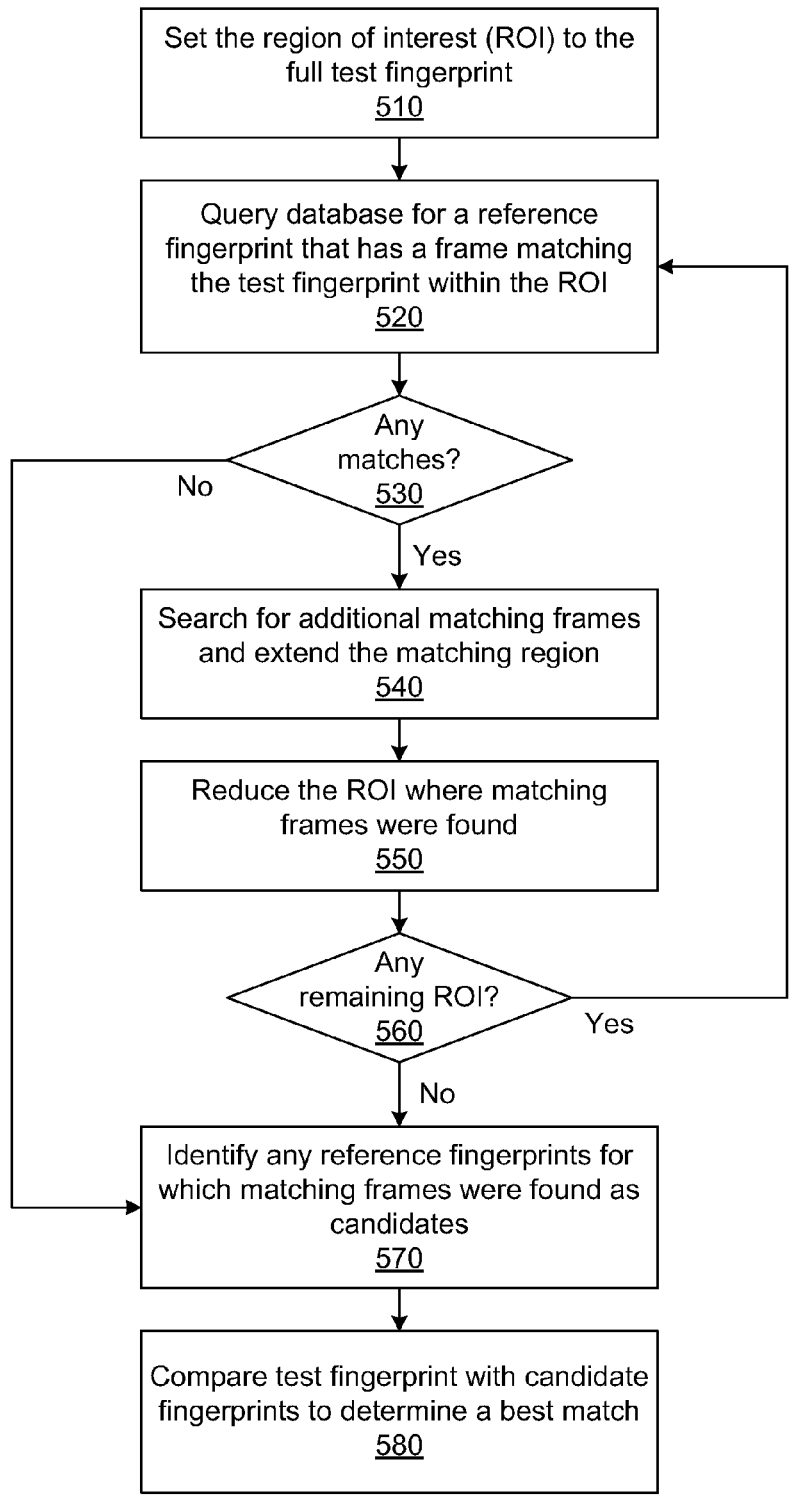
FIG. 5 is a flow chart of a process for identifying an unknown media item using a media identification system, in accordance with an embodiment of the invention.

FIG. 5 illustrates an efficient method for matching the test fingerprint 350 against the reference fingerprints 105, where the method reduces the number of candidate reference fingerprints that might otherwise be identified if all fingerprints having common portions are identified as candidates. The process uses a test fingerprint 350 generated for an unknown media item 310, as explained above. In a first step of this process, the media identification system 300 sets 510 the region of interest (ROI) for the test fingerprint 350 to include all of the frames 355 of the test fingerprint 350. In some embodiments, it may be desirable to ignore certain frames 355, in which case the process may begin by setting the ROI to include less than all of the frames 355 of the test fingerprint 350.

The media identification system 300 then queries 520 the reference fingerprint database 100 for a reference fingerprint 105 that has a frame 355 that matches a frame 355 of the test fingerprint 350 within the defined ROI. For the first query, the ROI may be set to the full set of frames 355 of the test fingerprint 350, so this query may return any reference fingerprint 105 that contains a matching frame 355. Various embodiments of matching algorithms are discussed above. If 530 the database 100 returns a matching reference fingerprint 105, the fingerprint 105 is said to be a candidate for a full match of the test fingerprint 350, and it is thus saved or marked for later processing.

Moreover, for this identified candidate, the media identification system 300 searches 540 for additional frames 355 of the candidate reference fingerprint 105 that match with the frames 355 of the test fingerprint 350. In one embodiment, this search may extend both forward and backward from the matching frame 355, thereby capturing a set of contiguous frames 355 that match between the test fingerprint 350 and the candidate reference fingerprint 105.

Figure 6:
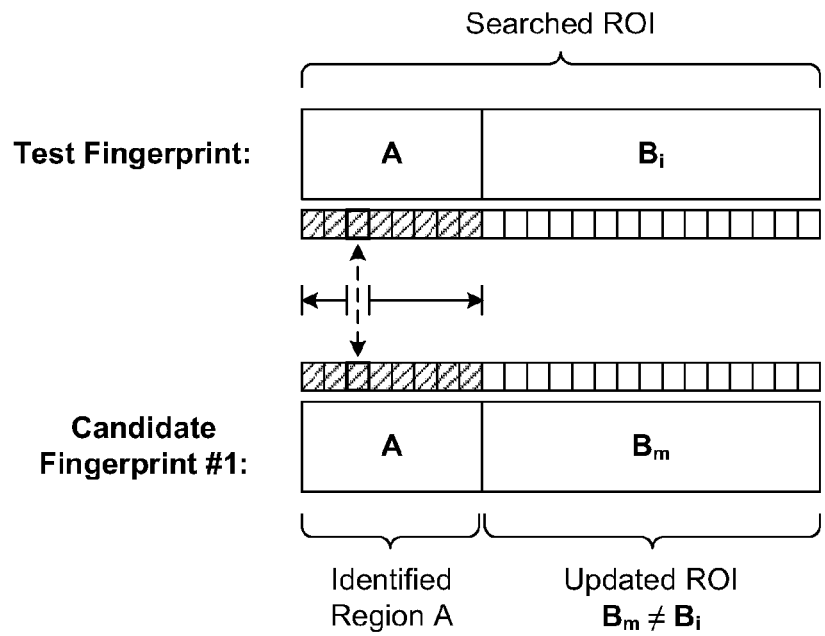
FIG. 6 illustrates the steps 540 and 550 of FIG. 5, searching for a candidate fingerprint and reducing the region of interest of the test fingerprint, for a first candidate fingerprint, in accordance with an embodiment of the invention.

One example of this is illustrated in FIG. 6. In FIG. 6, the test fingerprint includes a frame that matches a corresponding frame of a first candidate fingerprint 105, as indicated by the arrows connected by the dashed line. After finding a matching frame, the media identification system 300 then locates a number of adjacent matching frames, which are shaded in the example shown in FIG. 6. In other embodiments, the system may use other techniques for finding additional matching frames, which may include searching for more than just contiguous matching frames. If the system reaches a terminating (e.g., the first or the last) frame of the reference fingerprint, it may query the reference database for related fingerprints and, if a connected fingerprint is found, continue extending the match boundaries by comparing frames with the connected fingerprint.

Once a set of matching frames 355 are found, the media identification system 300 reduces 550 the ROI to eliminate from the ROI the frames 355 of the test fingerprint 350 that were found to match the previously identified candidate. This is illustrated in the example shown in FIG. 6, where the updated ROI has been reduced to eliminate the frames of the test fingerprint that have been matched to frames of a candidate fingerprint. Because any further queries of the reference fingerprint database 100 will be limited to the reduced ROI (according to step 520), this prevents identification of additional reference fingerprints 105 that match the test fingerprint 350 only with the Region A, shown in the drawings.

Once the ROI has been reduced, the media identification system determines 560 whether there is any remaining ROI for the test fingerprint 350. In one embodiment, the system eliminates regions having a size that is smaller than a threshold. If there is remaining ROI, the media identification system again queries 520 the database 100 for another reference fingerprint 105 that contains a frame 355 that matches a frame 355 of the test fingerprint 350 within the new ROI. If there are no further matches, the process skips ahead to step 570, discussed below. If a match is found, the searching step 540 and reducing step 550 described above are repeated for the additional candidate reference fingerprint 105.

Figure 7:
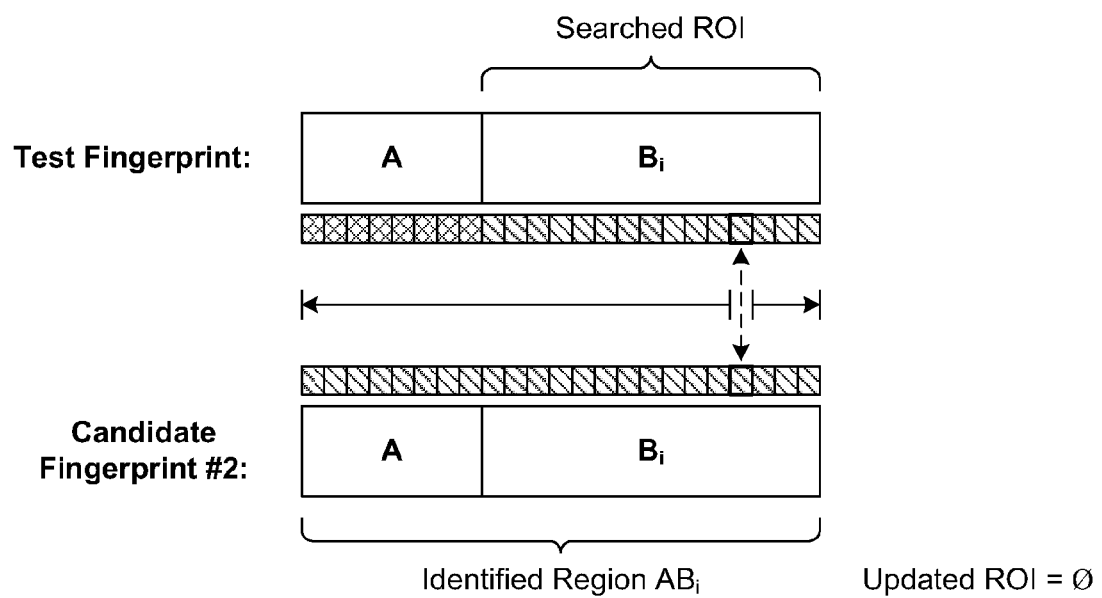
FIG. 7 illustrates the steps 540 and 550 of FIG. 5, searching for a candidate fingerprint and reducing the region of interest of the test fingerprint, for a second candidate fingerprint, in accordance with an embodiment of the invention.

One example of these steps for a second reference fingerprint is shown in FIG. 7, which continues the example from FIG. 6. As shown in FIG. 7, a frame of the test fingerprint within the updated searched ROI is found to match a frame of a second candidate fingerprint. As shown in FIG. 7, adjacent matching frames are also found. In this example, all frames of the test fingerprint have been matched, so the new updated ROI is null (i.e., contains no frames).

In one embodiment of the invention the search system excludes a found matching region from the ROI only if the match quality exceeds a quality threshold. Thus, if quality of a found match is low, then the system continues looking for candidates within the ROI until it finds a better match or enumerates all candidates.

Once either the ROI contains no frames 355 or the query 520 returns no matching reference 105 fingerprints for a given ROI, the media identification system 300 identifies 570 all reference fingerprints 105 for which a matching frame 355 has been found. These reference fingerprints 105 are each candidates to be the closest match to the test fingerprint 350. Accordingly, the media identification system 300 compares 580 the test fingerprint 350 to each identified candidate reference fingerprint 105 to determine which is the closest match. In one embodiment, this comparison is a bitwise comparison of the fingerprint data and the closest match is the candidate for which the greatest number or percentage of bits match (Hamming distance). However, many other tests can be used to determine a closest (or otherwise "best") match, within the scope of this invention.

In one embodiment, the candidate fingerprints may include all related overlapping reference fingerprints and fingerprints that share common metadata. The media identification system reports all verified and related reference fingerprints sorted in order of relevance, starting from the best match.

In another embodiment, the search process described in step 540 is implemented using a list of masked frames instead of a list of included frames. The list of masked frames is then a concatenation result of all of the previously identified frames.

In another embodiment, the search process tracks a list of all identified regions. At the beginning of the search, the list of identified regions is empty. Once a new matching region is found and extended to its maximum dimensions (boundaries), the media identification system adds this region to the list of identified regions. Similarly to dynamic ROI, the list of identified regions can be used to define frames of interest.

In another embodiment, an element of the list of identified regions may contain extended information about a match such as the match quality. If a better candidate for an already identified region is found, the previously identified lower quality candidate is discarded, and the better quality candidate is added to the list of identified regions instead.

In another embodiment, the search system compares the position and length of all found matches to eliminate matching regions, which are regions included in other found reference regions. In the example above, the first found Region A is a subset of the second identified Region $AB_i$ and therefore can be discarded. Non-overlapped and partially overlapped matching segments may represent different matching media objects and hence should be reported separately.

In one embodiment, the searching step 540 uses a dichotomic search algorithm. In such an embodiment, given a current defined ROI, the system 300 selects a midpoint within the ROI. The system 300 then perform 300 the database query and candidate selection for the frame of the fingerprint corresponding to the selected midpoint. If the query fingerprint around the midpoint matches a target, the system 300 then finds the match boundaries (i.e., extend the match forward and backward), excludes the frames from the ROI, and repeats the search using the midpoint for the resulting ROI. If the ROI is fragmented (i.e., the ROI includes noncontiguous frames 355 of the test fingerprint 350), the system 300 repeats the search for all regions starting from the largest one. If no matches are found around the selected midpoint, the system 300 may divide the ROI segment into two sub-segments and repeat this search recursively.

Figure 8A:
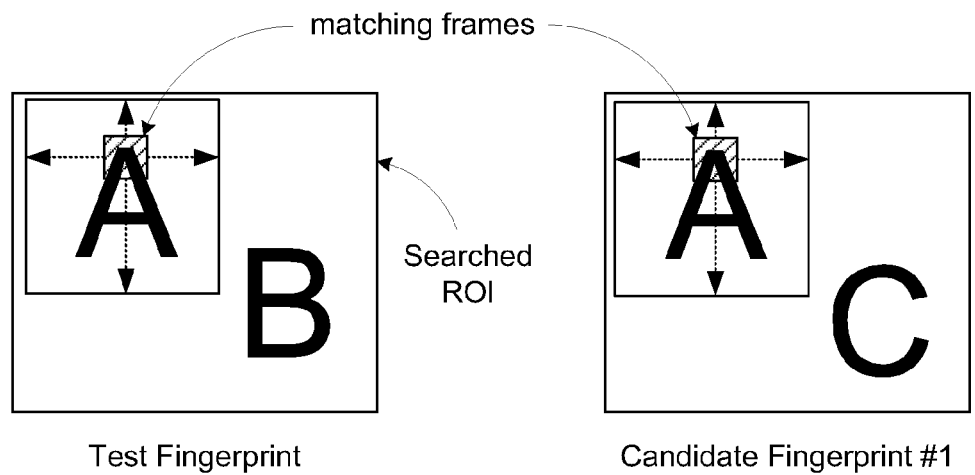
FIGS. 8A and 8B illustrate the steps of searching for a candidate fingerprint and reducing the region of interest of the test fingerprint for a first candidate fingerprint, where the media item is a two-dimensional image, in accordance with an embodiment of the invention.
Figure 8B:
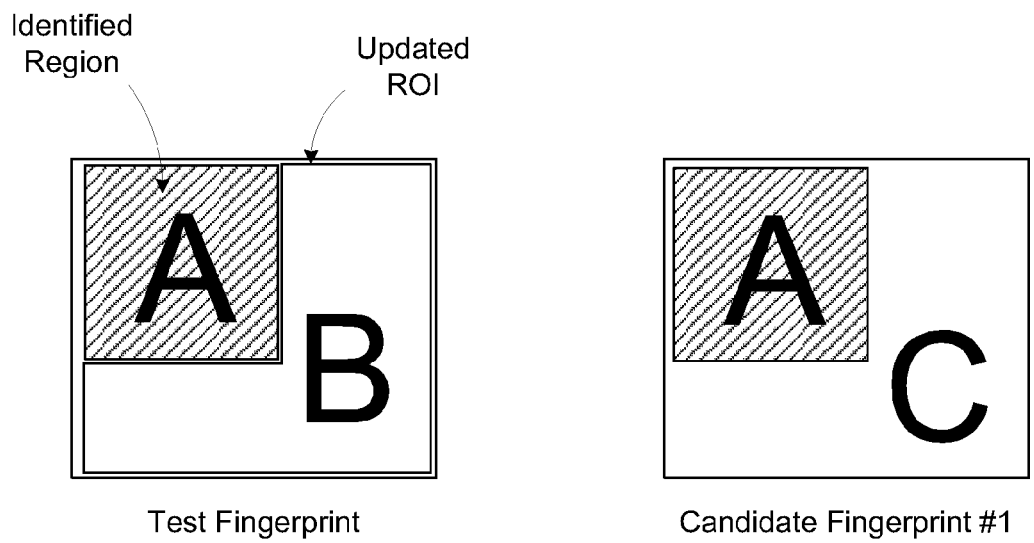
Figure 9A:
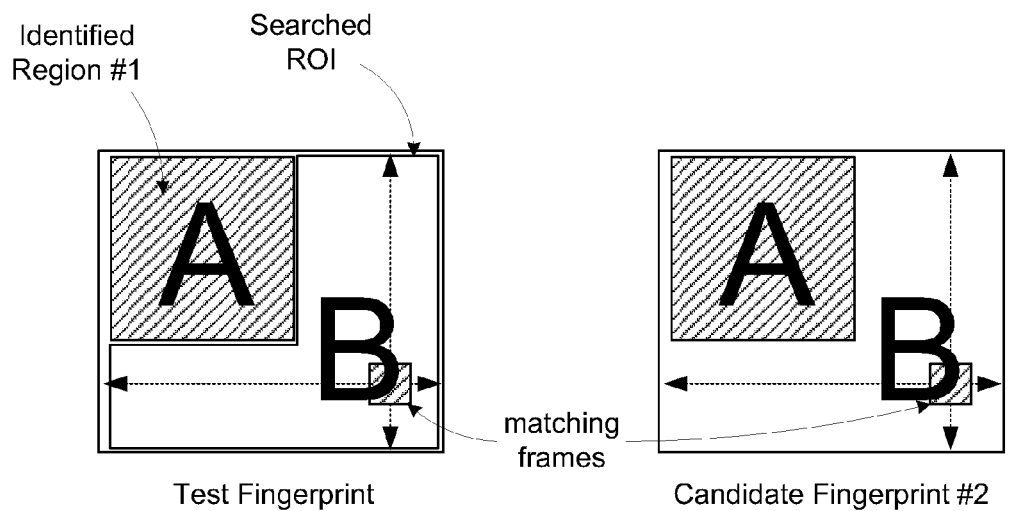
FIGS. 9A and 9B illustrate the steps of searching for a candidate fingerprint and reducing the region of interest of the test fingerprint for a second candidate fingerprint, where the media item is a two-dimensional image, in accordance with an embodiment of the invention.
Figure 9B:
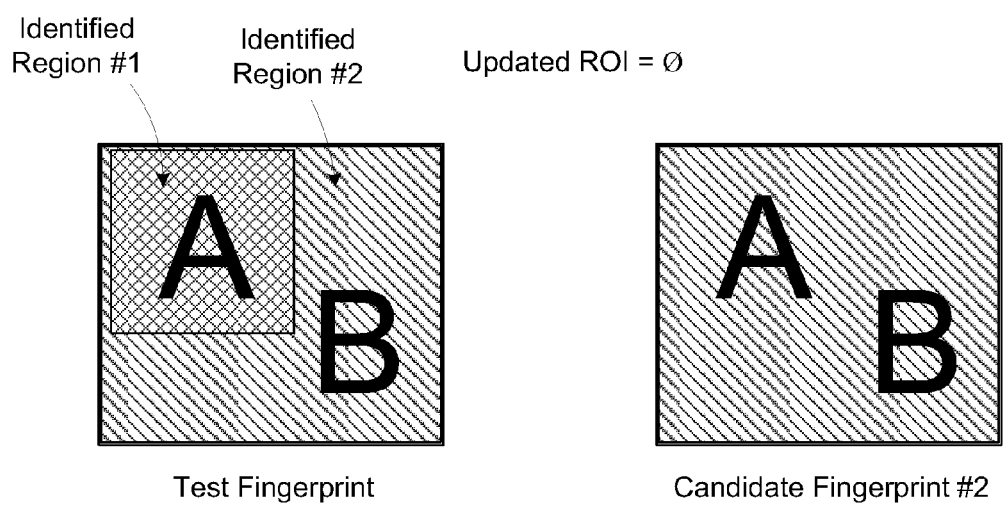

Embodiments of the invention have been described in terms of a single dimension, such as a time-based audio signal. In these embodiments, the frames of a fingerprint correspond to time segments of the media item. However, other embodiments may use fingerprints generated from signals that have two or more dimensions, such as digital video or images. In the case of images and videos, the fingerprints may be generated based on spatial dimensions, rather than or in addition to the time dimension. In these embodiments, the frames may correspond to these multiple dimensions, and as such the ROI may also be expressed in these dimensions. Accordingly, the techniques described herein may be extended to any number of dimensions on which the fingerprints and the frames are based. FIGS. 8A and 8B illustrate the steps of searching for a candidate fingerprint and reducing the region of interest of the test fingerprint for a first candidate fingerprint, for an example in which the media item is a two-dimensional image, and FIGS. 9A and 9B illustrate the steps of searching for a candidate fingerprint and reducing the region of interest of the test fingerprint for a second candidate fingerprint for the same media item. It can be appreciated that FIGS. 8A, 8B, 9A, and 9B are two-dimensional analogs of the example in FIGS. 6 and 7.

In another embodiment, one or more of the reference fingerprints 105 in the database 100 have an associated ROI. During the candidate searching step, if the index identifies a matching reference fingerprint 105 by pointing to a frame 355 of the fingerprint 105 that is outside the region of interest of that reference fingerprint 105, that fingerprint 105 is discarded without verification (i.e., is not treated as a candidate). This allows the database 100 to be checked for duplicates, where those duplicates (or any other reference fingerprints 105 or portions thereof) are masked out without having to be deleted from the database 100. For example, all but one of the duplicates that are found in the database 100 may be masked by excluding their frames from the reference ROI so that they will be discarded during the candidate search without additional processing and verification.

In one embodiment, the reference fingerprint database 100 performs indexing of only the parts of the stored items that belong to the associated ROI. In such a case, the indexing changes as the ROI is diminished, thereby making the candidate searching more efficient because fewer items will be indexed for the search.

In one embodiment, the reference fingerprint database 100 comprises a single layer distributed database with automatic load balancing. In this embodiment, a main (control) computer sends a query packet to all grid computers (i.e., distributed nodes). The query packet comprises a structure containing the query id, a fingerprint, and the ROI. After receiving the query, a search engine adds the query structure to the processing queue and signals the processing thread. The processing thread obtains the query from the queue and starts the search. If a match is found, the search process sends a broadcast message to all nodes (i.e., the computers in the grid). This broadcast message contains the query id and the list of identified regions. All computers look for the given query in the processing queue and modify the associated ROI (e.g., by subtracting from ROI the regions that have been already identified).

To illustrate this embodiment, in one example, a distributed database contains N episodes, which consist of a common part A and distinctive part B. The N−1 partial duplicates $(AB_n, n=[1 \ldots N], n \neq i)$ and one full duplicate $(AB_i)$ are evenly distributed in the grid (on multiple machines). The size of a database processing queue may vary. Assuming one of the grid machine with shorter processing queue found a partial match $AB_j$ (where $j \neq i$), which matches region A and does not match the following query region $B_i$, it sends a broadcast information message to all machines. After receiving the broadcast message, a database modifies the query (e.g., by excluding the found partial match A from ROI) and continues processing the queue. When the database obtains the query from the processing queue, it starts looking for matches starting from the first updated ROI segment, which may be the frame located after the end of a match. The only possible matching candidate for the updated ROI is the $B_i$ region of the target object $AB_i$. All other partial matches $[AB_1 \ldots AB_n]$ (where $n \neq i$) do not match $B_i$ and therefore would not produce candidates. After the $B_i$ candidate is found, the search engine extends the match forward and backward, producing full match $AB_i$. In this example, therefore, similarly to the single server database, instead of evaluating and loading N candidates, the distributed system has to verify only two candidates. In case of multiple partial matches (e.g., dozens or hundreds of episodes of the same show) the number of candidates and associated hard disk read/write operations can be reduced approximately by factor N/2, which may be significant.

In another embodiment, the reference fingerprint database 100 comprises a multilayer database. The first layer of the database 100 identifies and filters out (i.e., masks) reference fingerprints for media items that frequently appear in the searches (e.g., commercials, jingles, promos, and other common content that is found in many different media items). The second layer of the database 100 identifies the target media objects without spending time on loading and verification of candidates that were filtered out by the first layer. This approach may be particularly efficient, for example, for a reference database 100 that contains media content recorded from radio and TV broadcast streams.

In another embodiment, the distributed database comprises a grid, in which nodes process a query sequentially. In this embodiment, the query packet additionally contains a list of processing nodes in the grid. The list of processing nodes defines a path in which the query packet travels in the grid. Initially the query is sent to the first node in the list for identification, after processing the query, the first node sends the query to the second computer in the list and so on. Once a node identifies a portion of the query fingerprint, it updates the query ROI and, if the ROI is not empty, sends the query to the next node for processing. The process stops and the query results are sent for evaluation when ROI contains no more regions for processing or query packet completes traversal of all nodes. The processing path is initially calculated by sorting processing nodes based on their load and probability of identification of the query fingerprint. The most probable identification nodes are set at the beginning of the list and can be selected by analyzing the query content properties, such as content metadata, content source, encoding parameters, and duration, as well as specific signal properties. In one embodiment, a processing node updates the list of processing nodes to optimize the rest of the traversal path based on the obtained identification results.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method for identifying a media item, comprising:
    receiving, by a processor, a test fingerprint for a media item to be identified, the test fingerprint comprising a plurality of frames corresponding to segments of the media item, wherein a region of interest is defined for the test fingerprint to include the frames of the test fingerprint;
    accessing, by the processor, a database of reference fingerprints, each reference fingerprint comprising a plurality of frames corresponding to segments of known media items;
    performing, by the processor, a candidate search process, the candidate search process comprising:
        querying the database to match one or more frames of the test fingerprint that are within the region of interest to one or more frames of a reference fingerprint in the database,
        identifying the matching reference fingerprint as a candidate fingerprint,
        after finding a matching frame, locating a number of adjacent matching frames,
        reaching a terminating frame of the reference fingerprint,
        after reaching the terminating frame, querying the database for a related fingerprint,
        extending match boundaries by comparing frames with the related fingerprint, and
        redefining the region of interest to eliminate the matched frames of the test fingerprint from the region of interest; and
    returning, by the processor, one or more of the candidate fingerprints as being a possible match for the test fingerprint.

2. The method of claim 1, further comprising:
comparing the test fingerprint with the identified candidate fingerprints; and
identifying the unknown media item based at least in part on the comparing.

3. The method of claim 1, wherein the candidate search process is repeated until at least: (a) all of the frames of the test fingerprint have been eliminated from the region of interest, or (b) the database contains no more reference fingerprints having frames that match a frame of the test fingerprint within the region of interest.

4. The method of claim 1, further comprising:
defining a region of interest for one or more of the reference fingerprints in the database, wherein querying the database in the candidate search process ignores frames in the reference fingerprints that are outside of the region of interest defined for each reference fingerprint.

5. The method of claim 1, wherein the candidate search process further comprises, after finding a matching frame, locating a number of non-contiguous matching frames.

6. The method of claim 1, further comprising eliminating, by the processor, regions having a size that is smaller than a threshold.

7. The method of claim 1, further comprising comparing the test fingerprint to each identified candidate fingerprint to determine which is the closest match to the test fingerprint.

8. A system comprising:
a processor;
a storage medium for tangibly storing thereon program logic for execution by the processor, the program logic comprising:
receiving logic executed by the processor for receiving a test fingerprint for a media item to be identified, the test fingerprint comprising a plurality of frames corresponding to segments of the media item, wherein a region of interest is defined for the test fingerprint to include the frames of the test fingerprint;
accessing logic executed by the processor for accessing a database of reference fingerprints, each reference fingerprint comprising a plurality of frames corresponding to segments of known media items;
performing logic executed by the processor for performing a candidate search process, the candidate search process comprising:
querying the database to match one or more frames of the test fingerprint that are within the region of interest to one or more frames of a reference fingerprint in the database,
identifying the matching reference fingerprint as a candidate fingerprint,
after finding a matching frame, locating a number of adjacent matching frames,
reaching a terminating frame of the reference fingerprint,
after reaching the terminating frame, querying the database for a related fingerprint,
extending match boundaries by comparing frames with the related fingerprint, and
redefining the region of interest to eliminate the matched frames of the test fingerprint from the region of interest; and
returning logic executed by the processor for returning one or more of the candidate fingerprints as being a possible match for the test fingerprint.

9. The system of claim 8, further comprising:
comparing logic executed by the processor for comparing the test fingerprint with the identified candidate fingerprints; and
identifying logic executed by the processor for identifying the unknown media item based at least in part on the comparing.

10. The system of claim 8, wherein the candidate search process is repeated until at least: (a) all of the frames of the test fingerprint have been eliminated from the region of interest, or (b) the database contains no more reference fingerprints having frames that match a frame of the test fingerprint within the region of interest.

11. The system of claim 8, further comprising:
defining logic executed by the processor for defining a region of interest for one or more of the reference fingerprints in the database, wherein querying the database in the candidate search process ignores frames in the reference fingerprints that are outside of the region of interest defined for each reference fingerprint.

12. The system of claim 8, wherein the candidate search process further comprises, after finding a matching frame, locating a number of non-contiguous matching frames.

13. The system of claim 8, further comprising eliminating logic executed by the processor for eliminating regions having a size that is smaller than a threshold.

14. The system of claim 8, further comprising comparing logic executed by the processor for comparing the test fingerprint to each identified candidate fingerprint to determine which is the closest match to the test fingerprint.

15. A non-transitory computer readable storage medium comprising computer program code for execution by a processor, the computer program code comprising instructions for:
receiving, by a processor, a test fingerprint for a media item to be identified, the test fingerprint comprising a plurality of frames corresponding to segments of the media item, wherein a region of interest is defined for the test fingerprint to include the frames of the test fingerprint;
accessing, by the processor, a database of reference fingerprints, each reference fingerprint comprising a plurality of frames corresponding to segments of known media items;
performing, by the processor, a candidate search process, the candidate search process comprising:
querying the database to match one or more frames of the test fingerprint that are within the region of interest to one or more frames of a reference fingerprint in the database,
identifying the matching reference fingerprint as a candidate fingerprint,
after finding a matching frame, locating a number of adjacent matching frames,
reaching a terminating frame of the reference fingerprint,
after reaching the terminating frame, querying the database for a related fingerprint,
extending match boundaries by comparing frames with the related fingerprint, and
redefining the region of interest to eliminate the matched frames of the test fingerprint from the region of interest; and
returning, by the processor, one or more of the candidate fingerprints as being a possible match for the test fingerprint.

16. The non-transitory computer readable storage medium of claim 15, further comprising:
  comparing the test fingerprint with the identified candidate fingerprints; and
  identifying the unknown media item based at least in part on the comparing.

17. The non-transitory computer readable storage medium of claim 15, wherein the candidate search process is repeated until at least: (a) all of the frames of the test fingerprint have been eliminated from the region of interest, or (b) the database contains no more reference fingerprints having frames that match a frame of the test fingerprint within the region of interest.

18. The non-transitory computer readable storage medium of claim 15, wherein the candidate search process further comprises, after finding a matching frame, locating a number of non-contiguous matching frames.

19. The non-transitory computer readable storage medium of claim 15, further comprising eliminating, by the processor, regions having a size that is smaller than a threshold.

20. The non-transitory computer readable storage medium of claim 15, further comprising comparing the test fingerprint to each identified candidate fingerprint to determine which is the closest match to the test fingerprint.

* * * * *